US012613113B2

(12) United States Patent
Siraky et al.

(10) Patent No.: US 12,613,113 B2
(45) Date of Patent: Apr. 28, 2026

(54) ENCODER SYSTEM AND METHOD FOR DETERMINING THE READING HEAD POSITION IN AN ENCODER SYSTEM

(71) Applicant: NEURA ROBOTICS GMBH, Metzingen (DE)

(72) Inventors: Josef Siraky, Donaueschingen (DE); David Reger, Metzingen (DE); Jannick Brockmann, Hamburg (DE)

(73) Assignee: NEURA ROBOTICS GMBH, Metzingen (DE)

( * ) Notice: Subject to any disclaimer, the term of this patent is extended or adjusted under 35 U.S.C. 154(b) by 154 days.

(21) Appl. No.: 18/578,449

(22) PCT Filed: Jul. 1, 2022

(86) PCT No.: PCT/EP2022/068352
§ 371 (c)(1),
(2) Date: Jan. 11, 2024

(87) PCT Pub. No.: WO2023/285172
PCT Pub. Date: Jan. 19, 2023

(65) Prior Publication Data
US 2024/0295418 A1 Sep. 5, 2024

(30) Foreign Application Priority Data
Jul. 13, 2021 (DE) .......................... 102021118091.0

(51) Int. Cl.
G01D 5/245 (2006.01)

(52) U.S. Cl.
CPC .................................. G01D 5/2455 (2013.01)

(58) Field of Classification Search
CPC ................................ G01D 5/2455; G01D 5/34
See application file for complete search history.

(56) References Cited

U.S. PATENT DOCUMENTS

| | | | |
|---|---|---|---|
| 8,729,458 B2 | 5/2014 | Kato | |
| 2004/0089796 A1* | 5/2004 | Patzwald | G01D 5/34792 250/231.1 |

(Continued)

FOREIGN PATENT DOCUMENTS

| | | |
|---|---|---|
| DE | 19919042 A1 | 11/2000 |
| DE | 102010061737 A1 | 5/2012 |

(Continued)

OTHER PUBLICATIONS

English translation of office action issued by the JPO on Apr. 1, 2025, in parallel pending Japanese patent application No. 2024-501808.

(Continued)

*Primary Examiner* — Georgia Y Epps
*Assistant Examiner* — Don J Williams
(74) *Attorney, Agent, or Firm* — Nath, Goldberg & Meyer; Jerald L. Meyer

(57) ABSTRACT

An encoder system has a reading head and a material measure. The reading head has at least one first position sensor and at least one second position sensor. The position sensors are positioned at a fixed distance from one another in a reading direction. The material measure has a longitudinal direction and a transverse direction. The material measure has a first code segment in the longitudinal direction with a first absolutely coded code track. The reading head and the material measure are positioned relative to one another in such a way that the reading direction corresponds to the longitudinal direction. The reading head and the material measure are movable relative to one another in the reading direction. A first sensor position on the material measure can be detected by the first position sensor and a second sensor position can be detected on the material measure by the second position sensor.

14 Claims, 5 Drawing Sheets

(56)  References Cited

U.S. PATENT DOCUMENTS

Figure 1:
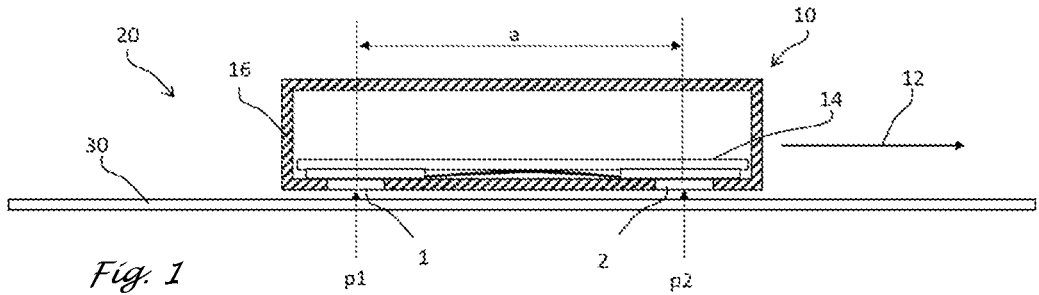

| | | |
|---|---|---|
| 2007/0069117 A1 | 3/2007 | Sakagami et al. |
| 2008/0111063 A1 | 5/2008 | Otsuka et al. |
| 2015/0233738 A1 | 8/2015 | Vokinger et al. |
| 2017/0059367 A1 | 3/2017 | Goldman et al. |

FOREIGN PATENT DOCUMENTS

| | | |
|---|---|---|
| DE | 102013220749 A1 | 5/2014 |
| DE | 102018200449 A1 | 7/2019 |
| DE | 102019122100 A1 | 2/2021 |
| EP | 1770374 A2 | 4/2007 |
| EP | 2288876 B1 | 9/2017 |
| JP | 2008-122320 A | 5/2008 |
| JP | 2009-063437 A | 3/2009 |
| JP | 2012-207923 A | 10/2012 |
| JP | 2017-062229 A | 3/2017 |
| WO | 2014030177 A1 | 2/2014 |
| WO | 2019119162 A1 | 6/2019 |
| WO | 2019192196 A1 | 10/2019 |

OTHER PUBLICATIONS

IPRP ISA/237 mailed Oct. 10, 2022, in PCT/EP2022/068352 with English translation.
European Office Action issued Jun. 7, 2022, in corresponding EP application No. 10 2021 118 091.0.
Search Report PCT ISA/220/210 mailed Oct. 10 in corresponding PCT/EP2022/068352.

* cited by examiner

ENCODER SYSTEM AND METHOD FOR DETERMINING THE READING HEAD POSITION IN AN ENCODER SYSTEM

This is a National Phase Application filed under 35 U.S.C. 371 as a national stage of PCT/EP2022/068352, filed Jul. 1, 2022, an application claiming the benefit of German Application No. 10 2021 118 091.0 filed Jul. 13, 2021, the content of each of which is hereby incorporated by reference in its entirety.

The invention relates to an encoder system as well as a method for determining the reading head position in an encoder system.

Absolute position or angle measuring systems, known as encoder systems, have been indispensable components in automation for decades. They usually comprise a reading head with a position sensor and a material measure. The position sensor and the material measure are attached to machine elements that move relative to one another in such a way that the position sensor can scan the material measure and detect a sensor position. The sensor position detected in this way usually corresponds to the reading head position. When compared to so-called incremental measuring systems, which must first move to a unique reference mark after the supply voltage has been switched on to determine the position, absolute systems have the advantage that, after switching on, each position on the material measure to be scanned can be detected as a unique absolute position.

In practice, it is often the case that the detected sensor position is incorrect due to interference, such as contamination of the position sensor or the material measure or magnetic field influences. Only after the position has been changed can it be recognized that the initial position was incorrect, as the monotony on which every absolute measuring system is based is disturbed (after sensor position n is detected, n+1 or n−1 does not follow).

A further problem is that particularly long material measures are very difficult to mount and handle, in particular, when glass material measures are used in optical systems. For example, a five-meter-long glass material measure configured in one piece involves a considerable amount of transport and assembly work.

To make the determination of the reading head position after switching on the supply voltage more reliable, it is known to use two position sensors that scan the material measure at the same point and to then compare their sensor positions. If there is a disturbance at the corresponding position, for example, due to contamination of the scale, both position sensors detect an incorrect position. A reliable determination of the current reading head position is therefore not possible.

The principle of joining material measures together one behind the other in short, manageable segments is shown in EP 2 288 876 B1. This can improve the ease of mounting and handling. This principle is associated with a loss of measurement accuracy, in particular, due to the offset that occurs when the segments are lined up one behind the other during assembly. Due to gaps between the segments, the overall length of a material measure can, for example, be greater than that of a corresponding one-piece material measure.

Beyond this, the measurement accuracy of an encoder system regularly suffers from the fact that, particularly as a result of temperature dependence, the length of the material measure changes.

The scenarios described lead to the fact that the reading head position detected deviates from the actual reading head position.

One task of the invention is therefore to provide an encoder system with which the reading head position can be determined simply, reliably and precisely, regardless of interference, and which can also be manufactured simply and cheaply. A further task of the invention is to provide a method with which the reading head position of an encoder system can be determined, despite interference, in an unambiguous, reliable and precise manner.

According to the invention, the task is solved by an encoder system with the features of claim 1 and a method for determining the reading head position in an encoder system.

Advantageous embodiments and further developments of the invention are given in the dependent claims.

An encoder system according to the invention has the following features: a reading head having at least one first position sensor and at least one second position sensor, wherein the position sensors are positioned at a fixed distance from one another in a reading direction, as well as a material measure having a longitudinal direction and a transverse direction, wherein the material measure has a first code segment in the longitudinal direction with a first absolutely coded code track, and wherein the reading head and the material measure are positioned relative to one another in such a way that the reading direction corresponds to the longitudinal direction, and that the reading head and the material measure are movable relative to one another in the reading direction, and that a first sensor position on the material measure can be detected by the at least one first position sensor and at the same time a second sensor position can be detected on the material measure by the at least one second position sensor.

The reading direction is preferably generated by the direction in which the reading head is moved relative to a material measure when used as intended in an encoder system. Due to their suitability for scanning absolutely coded code tracks, the position sensors are preferably configured in such a way that they can detect a position specification arranged on an absolutely coded code track. A reading head, which has a plurality of first position sensors and/or a plurality of second position sensors, is preferably configured in such a way that all position sensors are arranged at a distance from one another in the reading direction.

Preferably, the position sensors are oriented perpendicular to the reading direction. Due to the arrangement of the at least one first position sensor and the at least one second position sensor that are spaced out from one another, the reading head can preferably detect at least two different sensor positions. A reading head position can be determined from the sensor positions detected. The position sensors can be configured in such a way that they can detect the respective sensor position in the form of a digital value. The resolution of the determined reading head position can increase with the number of position sensors.

Inasmuch as the position sensors are arranged at a fixed distance from one another, even if one of the position sensors detects an implausible or non-meaningful sensor position, the correct sensor position of one position sensor and the reading head position can be deduced from the sensor position detected by the at least one other position sensor. An implausible or non-meaningful sensor position can, for example, be detected due to contamination.

The detected sensor position is preferably described as meaningful if it is generated by a value that actually occurs on the corresponding code track. The sensor position detected by a particular position sensor is preferably described as plausible if it can be assumed, in particular on the basis of the known fixed distances between the position sensors and the sensor positions detected by the other position sensors, that the sensor position detected by the one position sensor corresponds to its actual sensor position, at least to a sufficiently precise approximation.

The material measure is preferably configured as a glass scale. Inasmuch as the at least one first sensor position and the at least one second sensor position are detectable simultaneously on the material measure, the corresponding reading head position can be determined from at least two different sensor positions.

The encoder system preferably has two first position sensors and two second position sensors. This means that the reading head can comprise a total of four position sensors. As a result, the reading head position can be specified in a particularly reliable manner, especially in comparison to an embodiment of the reading head with two position sensors. In an embodiment with two position sensors, if both position sensors detect a meaningful sensor position and the detected sensor positions deviate excessively from the fixed distance between the position sensors, it is not possible to determine which of the two detected positions is plausible. This means that a reliable reading head position cannot be determined in such a situation. With an increasing number of position sensors, there is usually also a higher redundancy and therefore a higher degree of certainty when determining the reading head position. In an embodiment with two first position sensors and two second position sensors, if one of the sensors detects an incorrect but meaningful sensor position, the sensor positions detected by the remaining three position sensors can be used to easily determine which of the detected sensor positions is not plausible. By arranging four position sensors on the reading head, the incorrectly detected sensor position can be determined even if another position sensor detects a sensor position that is not meaningful.

Preferably, the two first position sensors and the two second position sensors are arranged alternately on the reading head, such that, in the reading direction, the first second position sensor, the second first position sensor, and the second second position sensor follow the first first position sensor, in this order.

In a preferred embodiment of the invention, the position sensors are configured as optical position sensors. With optical position sensors, the sensor positions can be detected very accurately and with very high resolution. In a particularly preferred manner, the position sensors are configured as optically reflective position sensors. The position sensors can also be configured as inductive, magnetic or capacitive position sensors.

Preferably, each of the position sensors is suitable for the simultaneous scanning of an absolute coded code track and an incrementally coded code track. This means that each of the position sensors is preferably configured in such a way that, in addition to a position specification arranged on an absolutely coded code track, it can also detect a position specification arranged on an incrementally coded code track. The fact that the absolute coded code track and the incrementally coded code track can be scanned simultaneously means that the respective sensor position can be detected with greater accuracy.

The position sensors can be arranged on a one-piece sensor carrier whose coefficient of thermal expansion is less than or equal to 2 ppm/K. This ensures that a change in temperature has a negligible effect on the fixed distance between the position sensors. In particular, if a temperature change with regard to the material measure to be scanned simultaneously causes a non-negligible change in length, the thermal expansion of the material measure can be determined from the sensor positions simultaneously detected by the position sensors and, if necessary, compensated for. The sensor carrier is particularly preferably made of quartz glass with a coefficient of thermal expansion of 1 ppm/K.

In a preferred embodiment of the invention, the first code segment has a first incrementally coded code track. In this way, the first code segment may comprise the first absolutely coded code track and the first incrementally coded code track. Preferably, the first incrementally coded code track is arranged in the transverse direction next to the first absolutely coded code track and in the longitudinal direction parallel to the first absolutely coded code track. The first absolutely coded code track and the first incrementally coded code track can be arranged next to one another in such a way that the position sensors, which are suitable for the simultaneous scanning of an absolutely coded code track and an incrementally coded code track, can simultaneously scan the first absolutely coded code track and the first incrementally coded code track.

The first incrementally coded code track is preferably configured in such a way that it comprises an incremental code that repeats itself cyclically and the periods of which can be assigned absolutely by means of the absolutely coded code track. Preferably, the incrementally coded code track comprises a finer partitioning and therefore a higher resolution than the absolutely coded code track. By simultaneously scanning the absolutely coded code track and the incrementally coded code track, high-resolution absolute sensor positions can be detected.

The material measure can comprise a second code segment, whereby the reading head and the material measure are arranged relative to one another in such a way that the respective first sensor position on the first code segment can be detected by the at least one first position sensor and the respective second sensor position on the second code segment can be detected simultaneously by the at least one second position sensor. In this manner, a higher redundancy and thus a greater reliability of the encoder system can be achieved.

The second code segment can comprise a second absolutely coded code track. The second code segment can moreover comprise a second incrementally coded code track. In this, the first code segment and the second code segment may be arranged such that the first incrementally coded code track and the second incrementally coded code track face one another. In one embodiment of the invention, the second incrementally coded code track can be formed by the first incrementally coded code track, such that the material measure has two absolutely coded code tracks and one incrementally coded code track.

Preferably, the first code segment and the second code segment are arranged in opposite directions to one another. In the longitudinal direction, the first code segment can thus have an ascending counting direction and the second code segment a descending counting direction or vice versa. Based on the at least one first detected sensor position and the at least one second detected sensor position, the reading head position can respectively be determined based on different calculation rules. In this way, an additional reliability in the determination of the reading head position can be achieved.

In one embodiment of the invention, the material measure has at least one material measure segment with a first segment end and a second segment end. In this way, the material measure can be easy to assemble and, in particular, easy to handle during assembly and transportation. During assembly, several material measure segments are preferably arranged one behind the other in order to achieve a correspondingly large overall length of the material measure. In the assembled material measure, an offset in the form of a gap can be arranged between two consecutive segment ends. The assembly can hereby be simplified.

The material measure can be linear and/or curved and/or circular. In particular, the material measure can be flexible. If the material measure is circular, the material measure can be arranged in such a way that the transverse direction and the longitudinal direction of the material measure are arranged perpendicular to the radius of a circle formed. The position sensors of the reading head are thus preferably oriented at least approximately towards the center of the circle. In this way, the reading head position on the circumference of the circle can be determined. The reading head position can then be used to determine the corresponding angle of rotation. The encoder system can therefore be used to determine the angle of rotation, particularly in applications where shafts with a large diameter are present and where high positional accuracy is required at the same time, for example, in observatories.

Preferably, the encoder system has an evaluation unit for evaluating the sensor positions, wherein the evaluation unit is configured to determine a reading head position from the respectively simultaneously detected sensor positions. In particular, the reading head position can be determined by averaging the detected sensor positions. In this, the reading head position can be defined as desired in relation to the position of the position sensors in the reading head. For example, the reading head position can be centrally arranged between the at least one first position sensor and the at least one second position sensor. By averaging the sensor positions detected by a plurality of position sensors arranged at a distance from one another, the resolution of the reading head position that is hereby determined can be increased.

The evaluation unit can be configured to check the sensor positions for plausibility and/or significance and to not use implausible and/or non-meaningful sensor positions to determine the reading head position. This allows the reading head position to be determined even if one or more of the determined sensor positions are unusable, which is to say, implausible or not meaningful.

Preferably, the evaluation unit comprises memory means for saving sensor positions and/or reading head positions. In this manner, this allows, in particular, certain sensor positions and/or reading head positions to be saved and used at a later time. In particular, in the case of material measures that have gaps between two consecutive segment ends, the gaps can be detected and saved during a teach-in run. If one of the position sensors detects a gap during later operation, the sensor position detected by it can, for example, be classified as plausible but not meaningful.

In particular, an encoder system that has a first code segment and a second code segment may comprise a plurality of material measures, wherein the first code segment and the second code segment can be arranged differently to one another in each material measure. Preferably, the material measures are arranged one behind the other in the longitudinal direction. This means that a measurement stretch on which a reading head position can be determined can be extended by the number of material measures arranged one behind the other. Due to the respectively different arrangement of the first code segment and the second code segment, the difference between the sensor positions detected simultaneously by the first position sensor and the second position sensor differs between the individual material measures. In this way, every position that the reading head can assume on the measuring section can preferably be determined in an absolute and unambiguous manner. By way of example, when compared to the previous material measure, it is possible for each material measure that the first code segment can be shifted by an absolute value to the second code segment. The maximum length of the measuring section is preferably only determined by the number of possible combinations of the first code segment with the second code segment.

A method for determining the reading head position in an encoder system according to any one of the described embodiments comprises the following steps:

Simultaneous detection of the respective first sensor position of the at least one first position sensor and the respective second sensor position of the at least one second position sensor, Verification of the plausibility and/or significance of each sensor position by comparing it with the respectively simultaneously determined other sensor positions, Determination of the reading head position based on the plausible and/or meaningful sensor positions.

Figure 2:
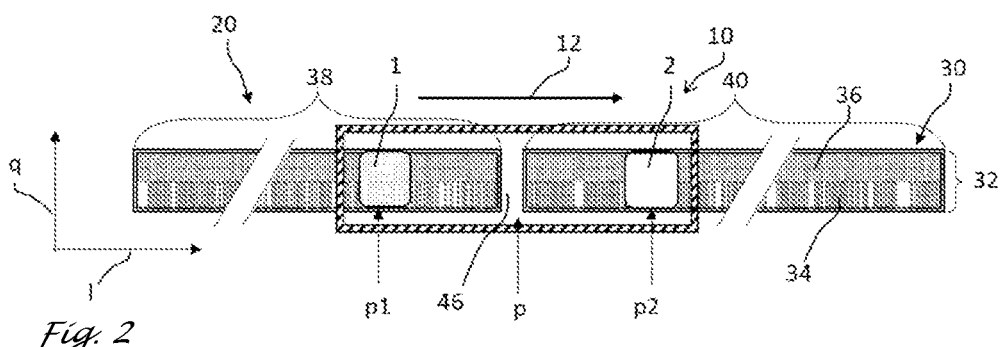
Figure 3:
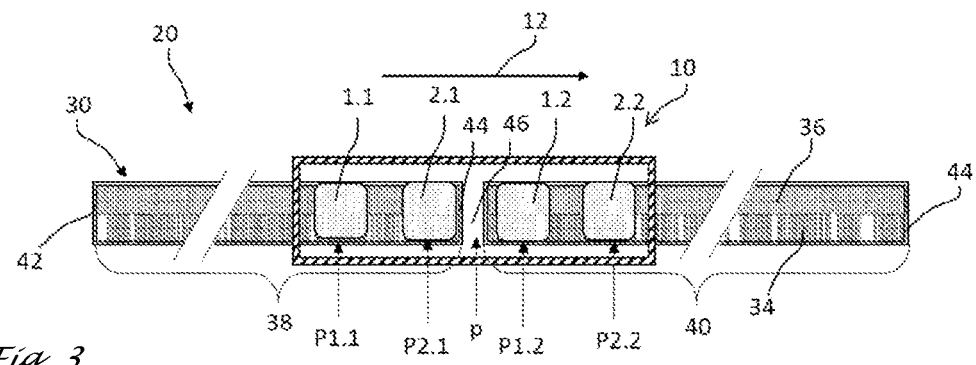
Figure 4:
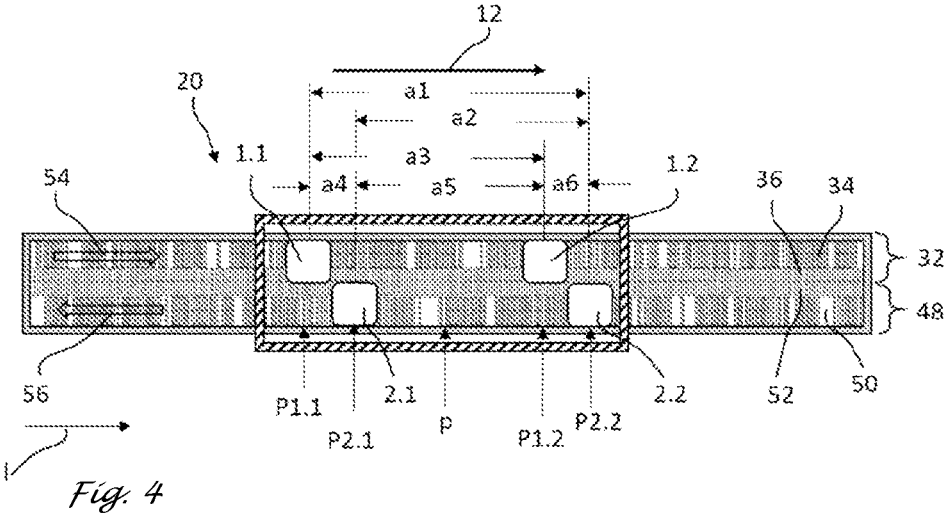
Figure 5:
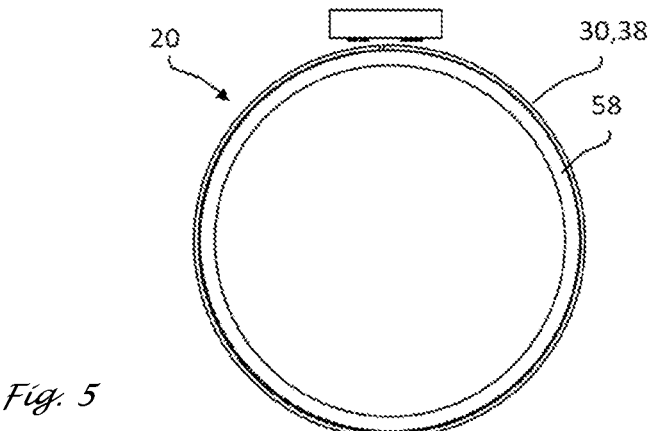
Figure 6:
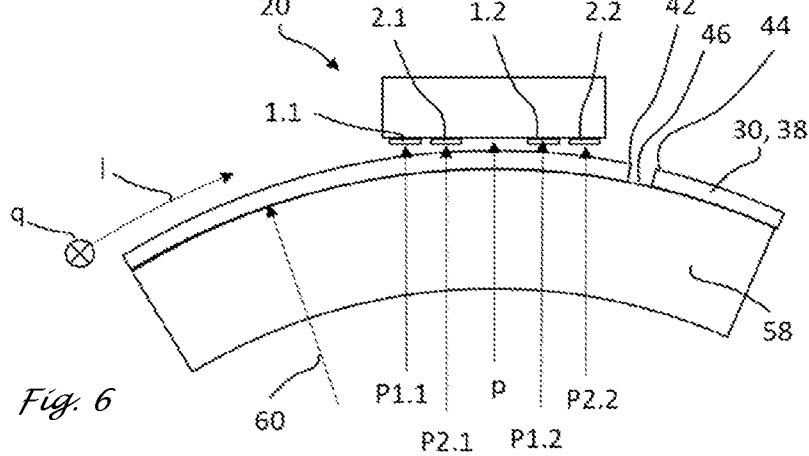
Figure 7:
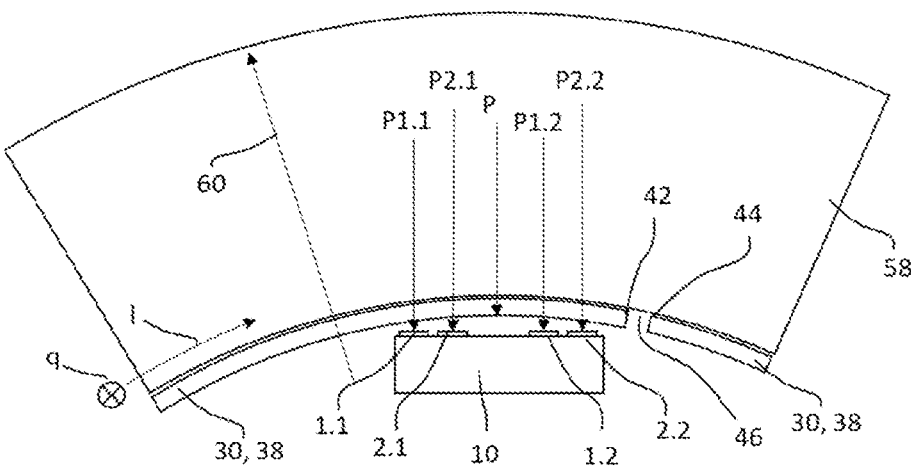
Figure 8:
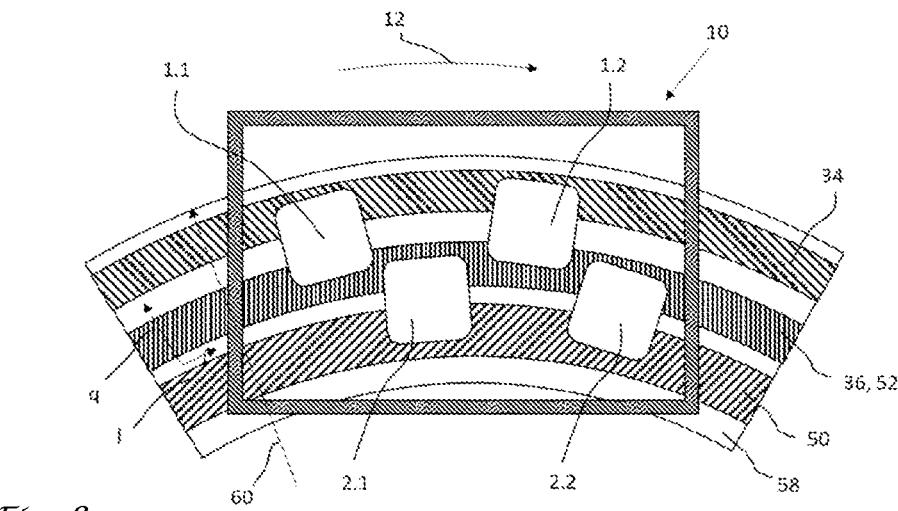
Figures 9, 10, 11:
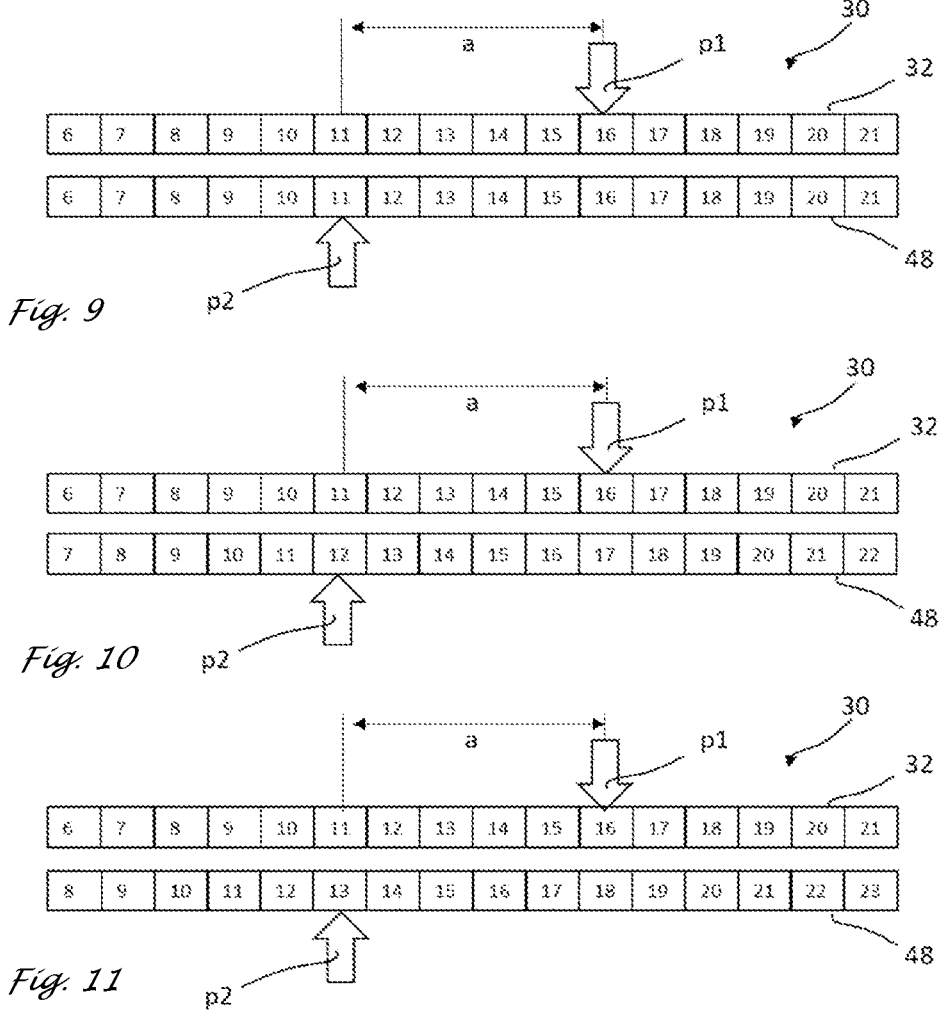

Embodiment examples of the invention are elucidated on the basis of the following figures. Wherein:

FIG. 1 shows a schematic side view of a first embodiment example of an encoder system, FIG. 2 shows is a schematic top view of a second embodiment example of an encoder system, FIG. 3 shows a schematic top view of a third embodiment example of an encoder system, FIG. 4 shows a schematic top view of a fourth embodiment example of an encoder system, FIG. 5 shows a schematic side view of a fifth embodiment example of an encoder system, FIG. 6 shows a schematic detailed view of the embodiment example of an encoder system shown in FIG. 5, FIG. 7 shows a schematic detailed view of a sixth embodiment example of an encoder system, FIG. 8 shows a schematic detailed view of a seventh embodiment example of an encoder system, FIG. 9 shows a schematic representation of a first embodiment example of a material measure, FIG. 10 shows a schematic representation of a second embodiment example of a material measure, FIG. 11 shows a schematic representation of a third embodiment example of a material measure.

FIG. 1 through FIG. 11 show different views of various embodiment examples. For the sake of clarity, not all reference signs are used in each figure. The same reference symbols are used for identical and functionally identical parts.

FIG. 1 shows a schematic side view of a first embodiment example of an encoder system 20 with a reading head 10 and a material measure 30. The reading head 10 comprises a first position sensor 1 and a second position sensor 2. The position sensors 1, 2 are suitable for scanning an absolute coded code track 34 and are arranged in a reading direction 12 at a fixed distance a from one another. The position sensors 1, 2 can be arranged on a one-piece sensor carrier 14. Preferably, the coefficient of thermal expansion of the sensor carrier 14 is less than or equal to 2 ppm/K. The sensor carrier 14 is particularly preferably made of quartz glass with a coefficient of thermal expansion of approximately 1 ppm/K. The reading head 10 may comprise a reading head housing 16 in which the position sensors 1, 2 are arranged. The position sensors 1, 2 can be configured as optical position sensors.

As shown in FIG. 2, the material measure 30 comprises a longitudinal direction l and a transverse direction q. In the longitudinal direction l, the material measure 30 has a first code segment 32 with the first absolutely coded code track 34. In addition, the first code segment 32 may comprise a first incrementally coded code track 36. The reading head 10 and the material measure 30 are arranged relative to one another in such a way that the reading direction 12 corresponds to the longitudinal direction l, and that the reading head 10 and the material measure 30 are movable relative to one another in the reading direction l. The reading head 10 and the material measure 30 are, moreover, arranged relative to one another in such a way that a first sensor position p1 on the material measure 30 can be detected by the first position sensor 1 and at the same time a second sensor position p2 on the material measure 30 can be detected by the second position sensor 2. The position sensors 1, 2 are preferably suitable for simultaneous scanning of the first absolutely coded code track 34 and the first incrementally coded code track 36.

The first incrementally coded code track 36 is preferably arranged in longitudinal direction l parallel to the first absolutely coded code track 34 and in transverse direction q next to the first absolutely coded code track 34. The first incrementally coded code track 34 is, moreover, preferably configured such that it comprises an incremental code which repeats cyclically and the periods of which can be absolutely assigned by means of the absolutely coded code track 34. Preferably, the incrementally coded code track 36 has a finer partitioning and thus a higher resolution than the absolutely coded code track 34. By a simultaneous scanning of the absolutely coded code track 34 and of the incrementally coded code track 36, high-resolution sensor positions p1, p2 can hereby be detected.

The material measures 30 shown in FIG. 2 and FIG. 3 each comprise a first material measure segment 38 and a second material measure segment 40. The material measure segments 38, 40 each comprise a first segment end 42 and a second segment end 44. An offset in the form of a gap 46 can be arranged between the successive segment ends 44, 42. In order to make it clear that a material measure element 38, 40 can extend over a greater length, the material measure segments 38, 40 are shown in FIG. 2 and FIG. 3 with diagonally arranged interruptions.

As the embodiment example in FIG. 3 shows, a reading head 10 may comprise a first first position sensor 1.1 and a second first position sensor 1.2 as well as a first second position sensor 2.1 and a second second position sensor 2.2. Preferably, the two first position sensors 1.1, 1.2 and the two second position sensors 2.1, 2.2 are arranged alternately on the reading head such that, in the reading direction 12, the first first position sensor 1.1 is followed by the first second position sensor 2.1, the second first position sensor 1.2, and the second second position sensor 2.2, in this order.

As shown in FIG. 2, the sensor position p1 can be detected by the first position sensor 1 and the sensor position p2 can be detected by the second position sensor. Correspondingly, the first first position sensor 1.1 can detect a first first sensor position p1.1, the second first position sensor 1.2 a second first sensor position p1.2, the first second position sensor 2.1 a first second sensor position p2.1, and the second position sensor 2.2 a second second sensor position p2.2 (and FIG. 3). Preferably, a reading head position p is determined from the sensor positions p1, p2 or alternatively p1.1, p1.2, p2.1, p2.1. The determination of the reading head position p can take place, for example, by averaging the sensor positions p1, p2 or alternatively p1.1, p1.2, p2.1, p2.2. The detection of the sensor positions p1 and p2 or alternatively p1.1, p1.2, p2.1 and p2.2 is preferably carried out simultaneously.

To evaluate the sensor positions p1, p2 or alternatively p1.1, p1.2, p2.1, p2.2, the encoder system 20 may comprise an evaluation unit, not shown, which is configured to determine the reading head position p from the simultaneously detected sensor positions p1, p2 or alternatively p1.1, p1.2, p2.1, p2.2. The reading head position p can be defined as desired in relation to the detected sensor positions p1, p2 or alternatively p1.1, p1.2, p2.1, p2.2. The reading head position p is preferably defined centrally between the detected sensor positions p1, p2 or alternatively p1.1, p1.2, p2.1, p2.2.

Inasmuch as the position sensors 1, 2 or alternatively 1.1, 1.2, 2.1, 2.2 are arranged at a fixed distance from one another in the reading direction, the reading head position p can also be determined when it coincides with the gap 46, as shown in FIG. 2 and FIG. 3. A teach-in run is preferably carried out before commissioning, in which teach-in run the gaps 46 are detected and saved. For this purpose, the evaluation unit may comprise, in particular, memory means for saving sensor positions p1, p2 or alternatively p1.1, p1.2, p2.1, p2.2 and/or reading head positions p.

In this, it should be noted that the encoder system 20 shown in FIG. 4 may comprise, in addition to the first code segment 32 with the first absolutely coded code track 34 and the first incrementally coded code track 36, a second code segment 48 with a second absolutely coded code track 50 and a second incrementally coded code track 52. The first code segment 32 and the second code segment 48 are, preferably, arranged in opposite directions to one another. The first code segment 32, particularly preferably, has a first counting direction 54, which is configured to be ascending in the longitudinal direction l, whereas the second code segment 48 may comprise a second counting direction 56, which can be configured to be descending in the longitudinal direction l.

In the embodiment example shown in FIG. 4, the position sensors 1.1, 1.2, 2.1, 2.2 can be arranged at fixed distances a1 to a6 from one another in the reading direction 12. The first position sensors 1.1, 1.2 are, preferably, arranged in such a way that they can detect the first code segment and the second position sensors 2.1, 2.2 in such a way that they can detect the second code segment 48.

During the determination of the reading head position p, implausible and/or non-meaningful sensor positions p1, p2 or alternatively p1.1, p1.2, p2.1, p2.2 are preferably not used. How a plausibility check can be carried out is elucidated below using the embodiment example shown in FIG. 4. In comparison to the embodiment examples shown in FIG. 2 and FIG. 3, it should be noted in particular that the first code segment 32 and the second code segment 48 are arranged in opposite directions to one another.

The plausibility of all simultaneously detected sensor positions p1.1, p1.2, p2.1, p2.2 preferably exists if all of the following conditions are met:

$$p1.1 + p2.1 = a4,$$
$$p1.2 + p2.2 = a6,$$
$$p1.2 - p1.1 = a3,$$
$$p2.1 - p2.2 = a2,$$
$$p1.1 + p2.2 = a1,$$
$$p2.1 + p1.2 = a5.$$

By evaluating the simultaneously detected sensor positions p1.1, p1.2, p2.1, p2.2 in this way, it can also be determined that a single detected sensor position p1.1, p1.2, p2.1, p2.2 is not plausible.

By comparing the distances between the simultaneously detected sensor positions p1.1, p1.2, p2.1, p2.2 with the fixed distances a1 to a6, systematic changes, such as a change in the length of the material measure, in particular as a result of a change in temperature, can, moreover, be detected and compensated for. The position sensors 1.1, 1.2, 2.1, 2.2 can, in particular, be arranged on a one-piece sensor carrier 14 made of quartz glass. This applies correspondingly to the embodiment examples shown in FIG. 2 and FIG. 3.

FIG. 5 and FIG. 6 show a further embodiment example of the encoder system 20. Here the material measure 30 can be circular. The material measure 30 is, preferably, arranged on a shaft 58 with a shaft radius 60. In this, the material measure 30 can be formed by the first material measure segment 38 with the first segment end 42 and the second segment end 44. The gap 46 is, preferably, arranged between the first segment end 42 and the second segment end 44. This can significantly simplify the assembly of the material measure 30 on the shaft 58. In accordance with the relevant elucidations relating to the embodiments shown in FIG. 2 and FIG. 3, the reading head position p can also reliably and unambiguously be determined if the reading head 10 is arranged above the gap 46.

The material measure 30 is preferably arranged in such a way that the transverse direction q and the longitudinal direction l are arranged perpendicular to the shaft radius 60. The position sensors 1.1, 1.2, 2.1, 2.2 of the reading head 10 are preferably oriented at least approximately to the center of the shaft and thus to the center of the circle of the circular material measure 30.

The material measure 30 is preferably arranged on the outer radius of the shaft 58. In particular, if the shaft 58 is configured as a hollow shaft, the material measure 30 can alternatively be arranged on the inner radius of the shaft 58, as shown in FIG. 7. In contrast to the embodiment example shown in FIG. 5 and FIG. 6, the reading head 10 can be arranged inside the shaft 58.

A further embodiment example, in which the material measure 30 can be circular, is shown in FIG. 8. Here the material measure 30 is preferably arranged in such a way that the transverse direction q is arranged in the direction of the shaft radius 60 and the longitudinal direction l is arranged perpendicular to the shaft radius 60. The position sensors 1.1, 1.2, 2.1, 2.2 of the reading head 10 are preferably oriented at least approximately in the direction of a longitudinal axis of a shaft that is not shown and runs perpendicular to the plane of the drawing. The material measure 30 can, for example, be arranged on the end face of a shaft end or a shaft shoulder.

In the embodiment example shown in FIG. 8, the second incrementally coded code track 52 can be formed by the first incrementally coded code track 36, such that the material measure 30 comprises two absolutely coded code tracks 34, 50 and one incrementally coded code track.

FIG. 9 through FIG. 11 show various embodiment examples of the material measure 30, which preferably comprise the first code segment 32 and the second code segment 48. In each of the embodiment examples shown in FIG. 9 through FIG. 11, the first code segment 32 and the second code segment 48 may be arranged differently from one another. The reading head 10 and the material measures 30 can be arranged relative to one another in such a way that the first sensor position p1 on the first code segment 32 can be detected by the position sensor 1 and at the same time the second sensor position p2 on the second code segment 48 can be detected by the second position sensor 2. Since the first position sensor 1 and the second position sensor 2 are arranged at a fixed distance a from one another in the reading head 10 (see also FIG. 1), the difference between the sensor positions p1 and p2, which are respectively simultaneously detected, differs between the material measures 30 shown in FIG. 9 through FIG. 11. Thus, the difference p1−p2 can be 6 in the embodiment example shown in FIG. 9, 5 in the embodiment example shown in FIGS. 10, and 4 in the embodiment example shown in FIG. 11.

If the material measures 30 shown in FIG. 9 through FIG. 11 are arranged one behind the other in the encoder system 20, a measuring section can be realized which has three times the length of the material measure 30. Inasmuch as the difference between the simultaneously detected sensor positions p1, p2 on each material measure 30 differs from the others, each position that the reading head 10 can assume on the measuring section can be determined absolutely and unambiguously. In various embodiment examples of the material measure 30, identical first code segments 32 and/or identical second code segments 48 are preferably used.

According to this procedure, a measuring section can be created in which the number of material measures 30 arranged one behind the other corresponds to the number of unique combination possibilities of the first code section 32 with the second code section 48. If, for example, a one-meter-long material measure 30 comprises code segments 32, 48 that are absolutely coded to one micrometer, one million material measures 30 with code segments 32, 48 arranged differently to one another can be obtained by offsetting the code segments 32, 48. Theoretically, a measuring section with a total length of 1 million meters, which is to say, 1000 km, can thereby be created.

In order to be able to detect unique sensor positions p1, p1.1, p1.2, p2.1, p2.2 and thus a unique reading head position p, the offset difference between the various material measures 30 will, in practice, preferably be in the millimeter magnitude. In the discussed example, a measurement stretch of one kilometer could be achieved.

LIST OF REFERENCE SYMBOLS

1 First position sensor
1.1 First first position sensor
1.2 Second first position sensor
2 Second position sensor
2.1 First second position sensor
2.2 Second second position sensor
10 Reading head
12 Reading direction
14 Sensor carrier
16 Reading head housing
20 Encoder system
30 Material measure
32 First code segment
34 First absolutely coded code track
36 First incrementally coded code track
38 First material measure segment
40 Second material measure segment
42 First segment end
44 Second segment end
46 Gap
48 Second code segment
50 Second absolutely coded code track 52 Second incrementally coded code track
54 Ascending counting direction
56 Descending counting direction
58 Shaft
60 Shaft radius
a Fixed distance
a1 First fixed distance
a2 Second fixed distance
a3 Third fixed distance
a4 Fourth fixed distance
a5 Fifth fixed distance
a6 Sixth fixed distance
l Longitudinal direction
p Reading head position
p1 First sensor position
p1.1 First first sensor position
p1.2 Second first sensor position
p2 Second sensor position
p2.1 First second sensor position
p2.2 Second second sensor position
q Transverse direction

The invention claimed is:

1. Encoder system comprising:
a reading head (10) having at least one first position sensor (1, 1.1, 1.2) and at least one second position sensor (2, 2.1, 2.2), wherein the position sensors (1, 1.1, 1.2, 2, 2.1, 2.2) are positioned at a fixed distance (a, a1, a2, a3, a4, a6, a6) from one another in a reading direction (12),
a material measure (30) having a longitudinal direction (l) and a transverse direction (q), wherein the material measure (30) has a first code segment (32) in the longitudinal direction (l) with a first absolutely coded code track (34),
wherein the reading head (10) and the material measure (30) are positioned relative to one another in such a way that the reading direction (12) corresponds to the longitudinal direction (l), and that the reading head (10) and the material measure (30) are movable relative to one another in the reading direction (12), and that a first sensor position (p1, p1.1, p1.2) on the material measure (30) can be detected by the at least one first position sensor (1, 1.1, 1.2) and at the same time a second sensor position (p2, p2.1, p2.2) can be detected on the material measure (30) by the at least one second position sensor (2, 2.1, 2.2), and
wherein the position sensors (1, 1.1, 1.2, 2, 2.1, 2.2) are arranged on a one-piece sensor carrier (14) whose coefficient of thermal expansion is less than or equal to 2 ppm/K.

2. Encoder system according to claim 1, characterized in that the reading head (10) has two first position sensors (1.1, 1.2) and two second position sensors (2.1, 2.2).

3. Encoder system according to claim 1, characterized in that the position sensors (1, 1.1, 1.2, 2, 2.1, 2.2) are configured as optical position sensors (1, 1.1, 1.2, 2, 2.1, 2.2).

4. Encoder system according to claim 1, characterized in that each of the position sensors (1, 1.1, 1.2, 2, 2.1, 2.2) is suitable for the simultaneous scanning of an absolute coded code track (34, 50) and an incrementally coded code track (36, 52).

5. Encoder system according to claim 1, characterized in that the first code segment (32) has a first incrementally coded code track (34).

6. Encoder system according to claim 1, characterized in that the material measure (30) has a second code segment (48), whereby the reading head (10) and the material measure (30) are arranged relative to one another in such a way that the respective first sensor position (p1, p1.1, p1.2) on the first code segment (32) can be detected by the at least one first position sensor (1, 1.1, 1.2) and the respective second sensor position (p2, p2.1, p2.2) on the second code segment (48) can be detected simultaneously by the at least one second position sensor (2, 2.1, 2.2).

7. Encoder system according to claim 6, characterized in that the first code segment (32) and the second code segment (48) are arranged in opposite directions to one another.

8. Encoder system according to claim 6, characterized in that the encoder system (20) has a plurality of material measures (30), wherein the first code segment (32) and the second code segment (48) are arranged differently to one another in each material measure (30).

9. Encoder system according to claim 1, characterized in that the material measure (30) has at least one material measure segment (38, 40) with a first segment end (42) and a second segment end (44).

10. Encoder system according to claim 1, characterized in that the material measure (30) is linear and/or curved and/or circular.

11. Encoder system according to claim 1, characterized in that the encoder system (20) has an evaluation unit for evaluating the sensor positions (p1, p1.1, p1.2, p2, p2.1, p2.2), wherein the evaluation unit is configured to determine a reading head position (p) from the respectively simultaneously detected sensor positions (p1, p1.1, p1.2, p2, p2.1, p2.2).

12. Encoder system according to claim 11, characterized in that the evaluation unit is configured to check the sensor positions (p1, p1.1, p1.2, p2, p2.1, p2.2) for plausibility and/or informative value and to not use implausible and/or non-meaningful sensor positions (p1, p1.1, p1.2, p2, p2.1, p2.2) to determine the reading head position (p).

13. Encoder system according to claim 11, characterized in that the evaluation unit has memory means for saving sensor positions (p1, p1.1, p1.2, p2, p2.1, p2.2) and/or reading head positions (p).

14. Method for determining the reading head position (p) in an encoder system (20) according to claim 1, comprising the following steps:
Simultaneous detection of the respective first sensor position (p1, p1.1, p1.2) of the at least one first position sensor (1, 1.1, 1.2) and the respective second sensor position (p2, p2.1, p2.2) of the at least one second position sensor (2, 2.1, 2.2),
Verification of the plausibility and/or significance of each sensor position (p1, p1.1, p1.2, p2, p2.1, p2.2) by comparing it with the respectively simultaneously determined other sensor positions (p1, p1.1, p1.2, p2, p2.1, p2.2), Determination of the reading head position (p) based on the plausible and/or meaningful sensor positions (p1, p1.1, p1.2, p2, p2.1, p2.2).

* * * * *